March 12, 1957 D. F. LEE 2,785,307

SYNCHRONISING CIRCUIT ARRANGEMENTS

Filed June 28, 1952 2 Sheets-Sheet 1

Inventor
DAVID FREDERICK LEE
By Ralph E. Atherton
Attorney

March 12, 1957 D. F. LEE 2,785,307

SYNCHRONISING CIRCUIT ARRANGEMENTS

Filed June 28, 1952 2 Sheets-Sheet 2

Inventor
DAVID FREDERICK LEE
By Ralph E. Atherton
Attorney

United States Patent Office 2,785,307

Patented Mar. 12, 1957

2,785,307

SYNCHRONISING CIRCUIT ARRANGEMENTS

David Frederick Lee, Uxbridge, England, assignor to Electric & Musical Industries Limited, Hayes, England, a company of Great Britain Application June 28, 1952, Serial No. 296,202

Claims priority, application Great Britain July 12, 1951

2 Claims. (Cl. 250—36)

This invention relates to synchronising circuit arrangements and more particularly, but not exclusively, to such arrangements used in television receivers.

It has been proposed to synchronise sawtooth oscillations with synchronising impulses in a so-called "flywheel" manner by combining said oscillations with said impulses so as to derive a control voltage which is used to control the frequency of a sawtooth oscillator. In such arrangements the control and accordingly the operation is liable to be disturbed if the synchronizing impulses are in any manner irregular. When such an arrangement is used in television to synchronise the line scanning oscillator with the transmitted line synchronising pulses irregularity occurs at the end of each frame scan when the line synchronising impulses are for a time doubled in frequency and increased in duration. Thus after the occurrence of such a group of impulses the control voltage is apt to be appreciably different from its value before the arrival of said group. As a result the frequency of said oscillator tends to be appreciably modified and the lines of the picture to be displaced. If smoothing is included in the control circuit sufficient to smooth out the irregularities of control due to the frame impulses the rate of action of the control may not be sufficient to prevent wandering of the frequency of the oscillator with consequent displacement of the picture lines. It is an object of the invention to provide a synchronising circuit arrangement in which these defects are reduced.

According to the invention there is provided a synchronising oscillator for generating oscillations, a source of synchronising impulses including narrow impulses and further impulses broader than said narrow impulses, means for generating from said narrow and broader impulses derived impulses synchronous with said narrow and broader impulses and each having the same duration independent of the duration of said narrow and broader pulses, phase comparison means, means for feeding said oscillations and derived impulses to said phase comparison means for comparing the phase of said derived impulses and the phase of said oscillations, means for deriving from said comparison means a control voltage, means for varying the frequency of said oscillator, and means for feeding said control voltage to said frequency varying means to control the frequency of the generated oscillations in dependence on the relative phase between the generated oscillations and said derived impulses.

According to a feature of the invention, said further impulses are generated by shock excitation of a resonant circuit by said synchronising impulses.

According to a further feature of the invention said oscillator is a blocking oscillator.

In order that the said invention may be clearly understood and readily carried into effect, it will now be more fully described by way of example with reference to the accompanying drawings.

Figure 1:
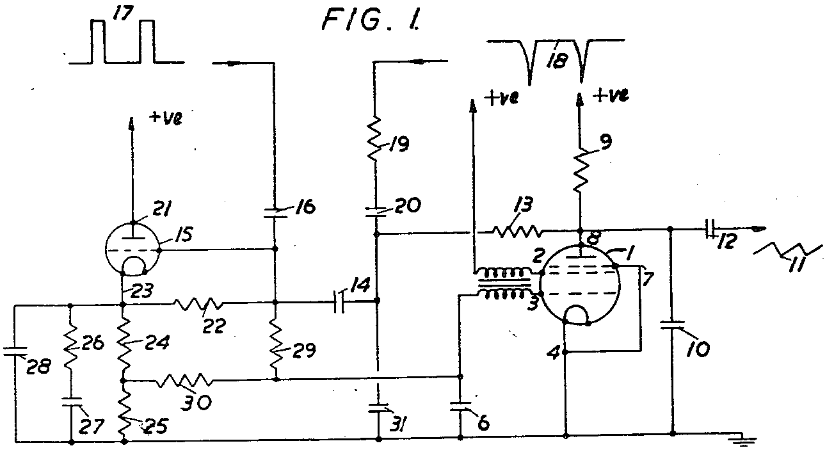
Figure 1 shows the circuit diagram of a known type of flywheel scanning oscillator for generating the line frequency oscillations required for line scanning purposes in a television receiver.

Referring to Figure 1 the numeral 1 represents a pentode type of valve in which the screen grid 2, the control grid 3, and the cathode 4 function as elements of a blocking oscillator. Said cathode is connected to earth, said grid is connected through the secondary of a transformer 5 and a condenser 6 in that order to earth, and said screen grid is connected through the primary of said transformer to the positive terminal of a source of supply potential. The suppressor grid 7 is connected to said cathode and the anode 8 is connected through a load resistance 9 to said source of supply potential. A charging condenser 10 charged through resistance 9 is connected between said anode and earth and sawtooth voltages 11 generated by the action of said blocking oscillator across said charging condenser are supplied through a blocking condenser 12 to an output valve (not shown). Said sawtooth voltages are fed through a resistance 13 and a condenser 14 to the control grid 15 of a triode valve to which are also supplied through a condenser 16 the incoming synchronising impulses 17. Voltage impulses 18 derived from said output valve are fed through a resistance 19 and condenser 20 in series to the junction of resistance 13 and condenser 14. A positive operating potential is supplied to the anode 21 of said triode valve. A grid resistance 22 is connected between grid 15 and cathode 23 of said triode valve and between said cathode 23 and earth is connected two resistances 24 and 25 in series, and in parallel with said resistances a resistance 26 and a condenser 27 in series, and a further condenser 28 is connected between said cathode 23 and earth. Two resistances 29 and 30 are connected in series between the grid 15 and the junction of resistances 24 and 25, and the junction of said resistances 29 and 30 is connected to the junction between the secondary of transformer 5 and the condenser 6. A condenser 31 is connected between the junction of condensers 14 and 20 and earth.

Figure 2:
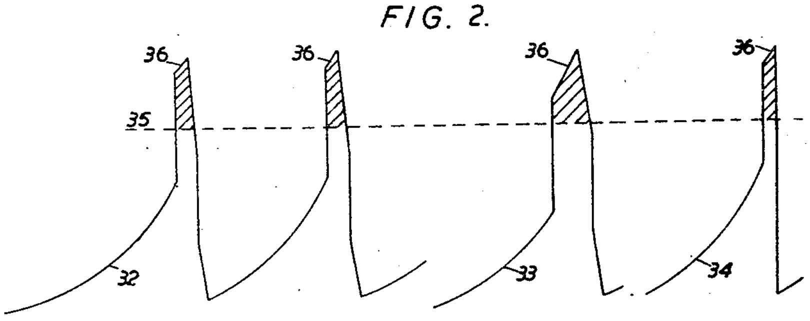
Figures 2 and 3 are explanatory diagrams.

In operation said pentode valve as stated generates sawtooth voltage oscillations as indicated by reference 11 across the condenser 10 and the frequency of these oscillations is dependent on the charging voltage applied to condenser 6 through resistance 30. Said voltage is provided by said triode valve and in a manner which is dependent on the difference in phase between the generated sawtooth oscillations 11 and the incoming synchronising impulses 17. The voltage fed to the grid 15 of the triode valve consists of positive synchronising impulses superimposed upon a voltage having a sawtooth and parabolic components. Thus said voltage consists of the incoming synchronising impulses fed through condenser 16 a sawtooth component derived from said current impulses 18 by integration by resistance 19 and the condensers 20 and 31, and a parabolic component obtained by integrating the sawtooth voltage 11 across condenser 10 by means of the resistance 13 and condenser 31. The waveform of the voltage applied to the grid 15 is shown in Figure 2 wherein the curve 32 shows said waveform when the generated sawtooth is in desired synchronism with the synchronising impulses, curve 33 shows said waveform when said impulses are arriving too early with respect to said sawtooth oscillations, and curve 34 shows said waveform when said impulses are arriving too late with respect to said sawtooth oscillations. The voltage of grid 15 corresponding to anode current cut-off is represented by the line 35 and said triode valve is therefore only conducting during the periods corresponding to the shaded portions 36 of said waveform. The pulses of current passed by said valve during said periods produce a mean steady potential across the condenser 28 proportional to the area of the portions 36 and therefore proportional to the phase difference between the generated sawtooth and the incoming synchronising impulses. The function of resistance 26 and condenser 27 is to prevent hunting which might otherwise occur. Said voltage appearing across condenser 28 is fed by means of the potentiometer formed by the resistances 24 and 25 to the condenser 6 and forms the charging potential therefor. Thus the value of this voltage determines the period of the sawtooth oscillations generated by said blocking oscillator.

Figure 3:
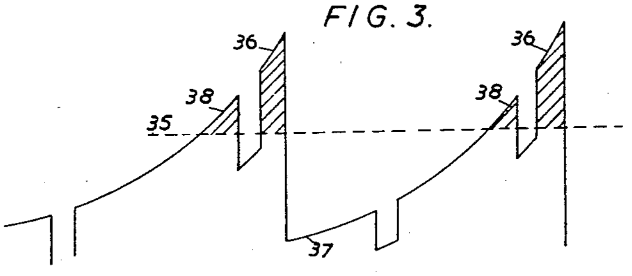

During the frame flyback period however, the line synchronising impulses are doubled in frequency and increased in duration and the resulting waveform appearing at the triode grid 15 is as indicated by 37 in Figure 3. Here as indicated by the shaded portion 38 there appears these further excursions of the waveform above the grid cut-off level 35 in addition to the shaded portions 36 shown in Figure 2 where line frequency pulses only are present. The pulses of current passed by said triode valve during the occurrence of the portions 36 are thus augmented by pulses of current passed during the occurrence of portions 38. The voltage set up at the junction of resistances 24 and 25 is thus spuriously augmented with the occurrence of frame flyback and the control of the frequency of the generated line frequency sawtooth oscillations 11 is disturbed so that the scanning lines become displaced in the picture for several line periods at least following frame flyback.

If instead of feeding the circuit directly with the incoming synchronising impulses it is fed according to the present invention with derived impulses which are similar irrespective of the form of said incoming impulses, the disturbance will be reduced. Such derived impulses are produced by the circuit shown in Figure 4.

Figure 4:
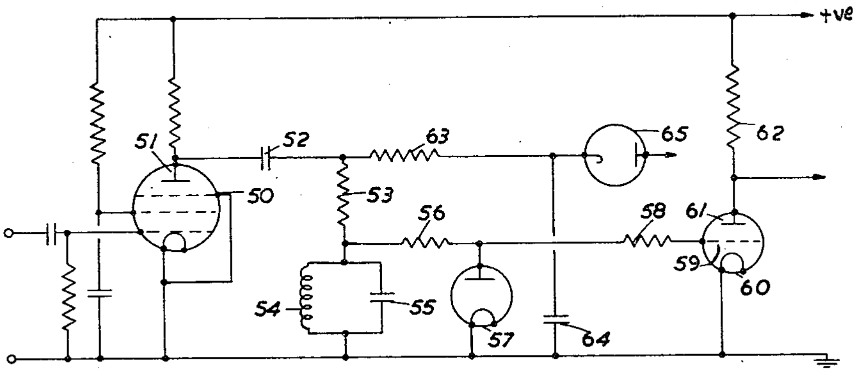
Figures 4 and 5 show the circuit diagrams of arrangements for deriving impulses according to the invention for use in association with a circuit of the type shown in Figure 1.

Referring to Figure 4 the complete video voltage comprising synchronising impulses in the positive direction and picture signals is supplied to a pentode valve 50 which is arranged to serve as a picture and synchronising separator in the conventional manner, synchronising impulses free from picture signals being obtained at the anode 51 of said valve. Said synchronising impulses are fed through a blocking condenser 52 and a resistance 53 to one end of a parallel resonant circuit comprising an inductance 54 and a condenser 55, the other end of said circuit being earthed. A resistance 56 and a diode valve 57 are connected in that order between the high potential end of said resonant circuit and earth the diode being so arranged that the cathode of said diode is connected to earth. The junction of said resistance 56 and said diode is connected through a resistance 58 to the grid electrode 59, of a triode valve the cathode 60 of which is connected to earth, and the anode 61 of which is connected through a load resistance 62 to the positive terminal of the source of supply potential. From the junction of condenser 52 and resistance 53 there is fed an integrating circuit 63, 64 and a diode valve 65 so as to provide impulses suitable for synchronising the frame oscillator (not shown).

In operation negative synchronising impulses appear at the anode 51 and cause the resonant circuit 54, 55 to generate by shock excitation a negative half-sine wave which is passed to the grid 59. When the voltage across 54, 55 tends to go positive the diode 52 conducts and shunts said circuit with the resistance 56 which is just sufficiently large to critically damp said circuit so that there is no further oscillation. It is arranged that the half period of the resonant circuit is rather less than the duration of a line synchronising impulse. Thus, whether the applied synchronising impulses are the normal line synchronising impulses or those pulses broadened and doubled in frequency to provide frame synchronisation, impulses of the same width will be passed to the grid 59 of the triode namely in the form of said negative half-sine wave and there will be no disturbance of the line frequency synchronisation. The output from the anode 61 is passed to the flywheel scanning circuit for example to the condenser 16 of the circuit of Figure 1.

Figure 5:
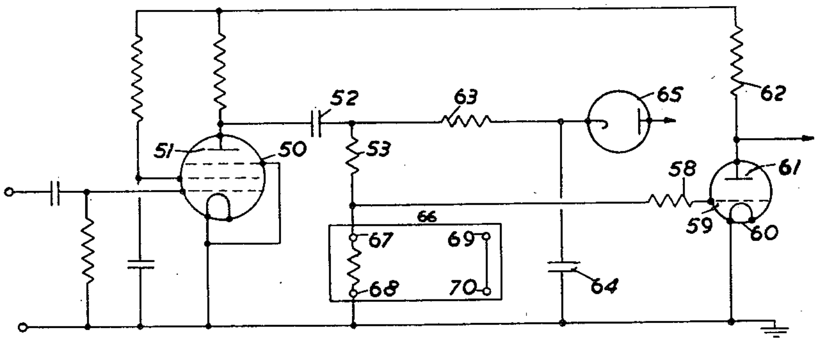

An alternative arrangement for deriving impulses according to the invention is shown in Figure 5. This arrangement is similar to that of Figure 4 except that the inductance 54, the condenser 55, the resistance 56 and the diode 57 are replaced by the short-circuited delay line 66 whilst the resistance 53 is connected to one of the input terminals 67 of said delay line and the other input terminal 68 is connected to ground. The terminals 69 and 70 at the far end of said delay line are short-circuited. In view of the short-circuiting of said terminals impulses applied from the anode of the valve 50 to the input terminals 67 and 68 are reflected back upon said terminals from the short-circuited end of the delay line in reverse sense. Thus impulses incident upon the input terminals 67 and 68 which are of duration greater than the time that it takes for a pulse to propagate to the far end of said delay line and back to said input terminals are terminated with the arrival at said input terminals of the reflection from the short-circuited terminals 69 and 70. Said delay line is constructed so that the total delay time from the input terminals to the far end of said line and back to said input terminals is less than the duration of the line frequency impulses appearing at the anode of valve 50. It follows therefore that there are set up at the input terminals 67 and 68 of the delay line 66 derived pulses of the same duration whether the pulses incident upon said input terminals from the anode of valve 50 are line pulses or the broadened line pulses which constitute the frame synchronising pulses. Said derived impulses are used in accordance with the invention for synchronising the scanning oscillator of Figure 1.

What I claim is:

1. A synchronizing circuit arrangement comprising an oscillator for generating oscillations, a source of synchronizing impulses including narrow impulses and further impulses broader than said narrow impulses, means for generating from said narrow and broader impulses derived impulses synchronous with said narrow and broader impulses and each having the same duration independent of the duration of said narrow and broader impulses, said generating means including a resonant circuit and means for feeding said narrow and broader impulses to said resonant circuit to shock-excite said circuit to generate said derived impulses, phase comparison means, means for feeding said oscillations and derived impulses to said phase comparison means for comparing the phase of said derived impulses and the phase of said oscillations, means for deriving from said comparison means a control voltage, means for varying the frequency of said oscillator, and means for feeding said control voltage to said frequency varying means to control the frequency of the generated oscillations in dependence on the relative phase between the generated oscillations and said derived impulses.

2. A synchronizing circuit arrangement comprising a blocking oscillator for generating oscillations, a source of synchronizing impulses including narrow impulses and further impulses broader than said narrow impulses, means for generating from said narrow and broader impulses derived impulses synchronous with said narrow and broader impulses and each having the same duration independent of the duration of said narrow and broader impulses, said generating means including a resonant circuit and means for feeding said narrow and broader impulses to said resonant circuit to shock-excite said circuit to generate said derived impulses, phase comparison means, means for feeding said oscillations and derived impulses to said phase comparison means for comparing the phase of said derived impulses and the phase of said oscillations, means for deriving from said comparison means a control voltage, means for varying the frequency of said oscillator, and means for feeding said control voltage to said frequency varying means to control the frequency of the generated oscillations in dependence on the relative phase between the generated oscillations and said derived impulses.

References Cited in the file of this patent

UNITED STATES PATENTS

| | | |
|---|---|---|
| 2,292,148 | Moe | Aug. 4, 1942 |
| 2,339,536 | Wendt | Jan. 18, 1944 |
| 2,521,504 | Dome | Sept. 5, 1950 |
| 2,540,820 | Gruen | Feb. 6, 1951 |
| 2,585,929 | Gruen | Feb. 19, 1952 |
| 2,645,717 | Massman | July 14, 1953 |